April 13, 1965 R. M. ROSE ETAL 3,177,807
METHOD OF MAKING A SELECTIVE TYPE DRUM
Filed April 12, 1963
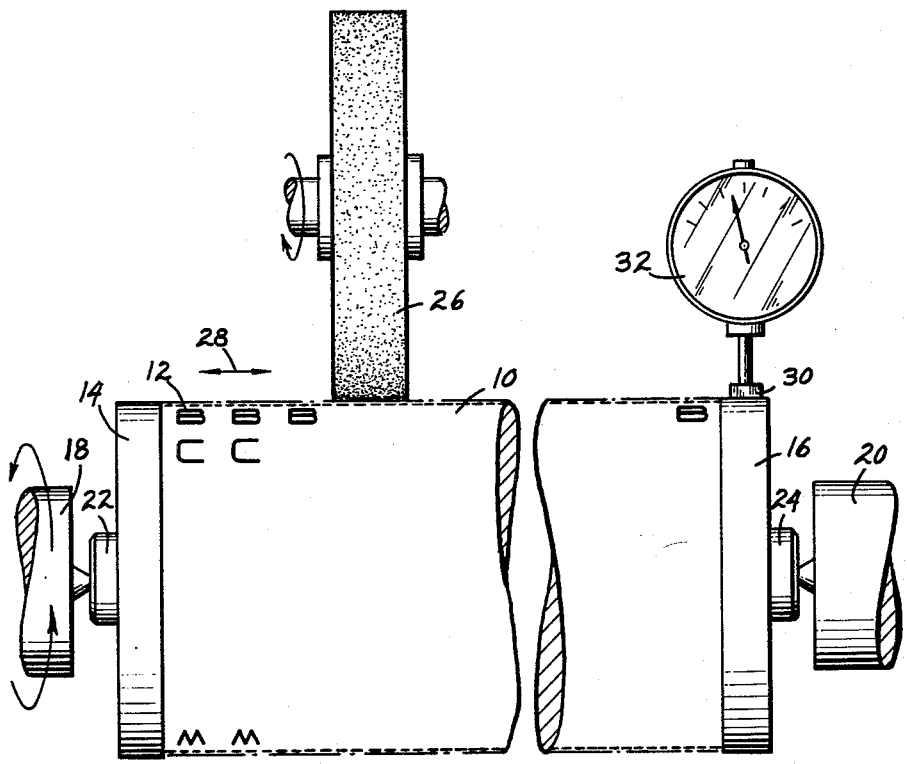
INVENTORS
ROBERT M. ROSE
W. F. HEINE
BY
Douglas M. Clarkson
ATTORNEY 3,177,807
METHOD OF MAKING A SELECTIVE TYPE DRUM
Robert M. Rose, Brooklyn, and Wolfgang F. Heine, Huntington Station, N.Y., assignors to Potter Instrument Company, Inc., Plainview, N.Y., a corporation of New York
Filed Apr. 12, 1963, Ser. No. 272,632
2 Claims. (Cl. 101—401.3)

This invention relates to rotating drum printers and, more particularly, relates to an improved drum and to an improved method of manufacture of such rotating drums in which the concentricity of the character surface can be maintained more precisely.

Rotating drum types of printers in which a plurality of parallel fonts are provided in rows about the periphery of a rotating drum are known to the art. As the drums rotate, magnetically acuated printing hammers can be tripped to force the recording medium against the desired character thereby to imprint the character on the recording medium.

Since it is of prime importance that concentricity of the drum O.D. (outside diameter) relative to the shaft be maintained, the measurement of this parameter becomes critical. However, with the conventional drums, it is difficult to measure the concentricity as, for example, by rotating the drum under a dial indicator since the dial indicator stem will follow the character variations in addition to following the ground outer surface. Since the latter is of prime importance, the measurement is obscure since it is impossible to determine whether the dial indicator is indicating a lack of concentricity or is indicating a low spot in the character.

It is a primary object of this invention to provide an improved rotating drum for impact printers and to provide an improved method for the manufacture of such drums.

Other objects and advantages of this invention will be pointed out hereinafter in the following detailed description of a preferred embodiment which may best be understood by the accompanying single figure which is an elevation view of a drum during manufacture thereof which is illustrative both of the drum and the method of manufacture of the same.

In the figure, there is shown a drum 10 for a rotating drum type of printer on the surface of which there is provided a plurality of rows of raised alphabetical characters 12. The drum is constructed with a band 14 and 16 at each end thereof, the O.D. of which is equal to the O.D. measurement to the top of the characters.

The fabricated drum then is mounted on centers 18 and 20 within the shaft centers in protruding shafts 22 and 24 on each end thereof and is rotated. A rotatably driven grinding wheel 26 then is driven axially along the surface thereof as indicated by arrow 28 in conventional fashion to grind the drum characters and the outer diameter of the bands 14 and 16 together during each traverse of the grinding wheel 26.

Since the entire drum, including the bands 14 and 16, is ground with each pass of the wheel 26, concentricity can be measured by applying the stem 30 of a dial indicator 32 to the band surface. The concentricity of the band is equal to that of the outermost surface of the characters, but since the surface of the band is smooth, the concentricity can be measured in simple and expedient fashion.

This invention may be variously modified and embodied within the scope of the subjoined claims.

What is claimed is:
1. The method of manufacturing printing drums for rotating drum printers which comprises,
   forming a generally cylindrical drum,
      indenting the central portion of the drum by and
         providing a plurality of rows of raised alphabetical-numerical characters in said indented portion and
         leaving opposite ends of the drum to define bands,
   mounting said drum on centers,
   rotating said drum on said centers,
   grinding the drum as it is rotated on said centers by a grinding wheel which is passed over the entire drum including said characters and said bands at each end thereof, and
   measuring the concentricity of the characters by taking measurements of concentricity of the smooth surfaces of said bands.

2. The method of manufacturing printing drums for rotating drum printers which comprises,
   forming a generally cylindrical drum,
   forming a plurality of rows of raised printing characters in a predetermined pattern circumferentially about said drum,
   forming a band circumferentially about said drum so that the outer surface of said band is substantially coextensive with the tops of said characters,
   mounting said drum on centers,
   rotating said drum on said centers,
   grinding the drum as it is rotated on said centers by a grinding wheel which is passed over the characters and the band, and
   measuring the concentricity of the characters by taking measurements of concentricity of the outer surface of said band.

References Cited by the Examiner
UNITED STATES PATENTS

| | | | |
|---|---|---|---|
| 193,715 | 7/77 | Latham et al. | 51—49 |
| 750,531 | 1/04 | Ford et al. | 51—49 |
| 887,730 | 5/08 | Lee | 101—213 |
| 1,792,043 | 2/31 | Scusa | 33—172 |
| 2,351,612 | 6/44 | Hawley | 101—216 |
| 2,355,529 | 8/44 | Hawley | 101—401.3 |
| 2,567,360 | 9/51 | Balsiger | 51—165.20 |
| 2,919,967 | 1/60 | Schwertz | 101—93 X |
| 3,058,415 | 10/62 | Hoffman | 101—93 |
| 3,073,690 | 1/63 | Hollis et al. | 51—325 |

WILLIAM B. PENN, *Primary Examiner.*